(12) United States Patent
Mostert

(10) Patent No.: US 9,560,831 B2
(45) Date of Patent: *Feb. 7, 2017

(54) CONDUIT AND A METHOD OF CLEANING A CONDUIT

(71) Applicant: LELY PATENT N.V., Maassluis (NL)

(72) Inventor: Gerard Mostert, Schipluiden (NL)

(73) Assignee: LELY PATENT N.V., Maassluis (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,126

(22) Filed: Mar. 9, 2015

(65) Prior Publication Data

US 2015/0173321 A1 Jun. 25, 2015

Related U.S. Application Data

(63) Continuation of application No. 13/497,435, filed as application No. PCT/NL2010/000154 on Oct. 26, 2010, now Pat. No. 8,997,778.

(30) Foreign Application Priority Data

Nov. 9, 2009 (NL) ...................................... 1037456

(51) Int. Cl.
*A01J 7/02* (2006.01)
*F16K 49/00* (2006.01)
(Continued)

(52) U.S. Cl.
CPC .. *A01J 7/02* (2013.01); *A01J 5/00* (2013.01); *A01J 5/044* (2013.01); *A01J 7/00* (2013.01); *A01J 7/022* (2013.01); *A01J 11/00* (2013.01); *F16L 9/18* (2013.01); *F16L 11/12* (2013.01); *F16L 11/22* (2013.01); *Y10T 137/0318* (2015.04); *Y10T 137/0419* (2015.04); *Y10T 137/4259* (2015.04); *Y10T 137/6416* (2015.04); *Y10T 137/6579* (2015.04)

(58) Field of Classification Search
CPC .............. A01J 7/02; A01J 7/027; A01J 11/00; A01J 7/00; A01J 5/044; A01J 7/022; F16L 9/18; F16L 11/12; F16L 11/22
USPC ......................................... 137/240, 340, 343
See application file for complete search history.

(56) References Cited

U.S. PATENT DOCUMENTS 2,598,207 A 5/1952 Bailey et al.
2,766,765 A 10/1956 Bolanowski et al.
(Continued)

FOREIGN PATENT DOCUMENTS

DE 29 00 819 7/1980
FR 621 883 5/1927
GB 2 335 728 9/1999

OTHER PUBLICATIONS

International Search Report Issued Jan. 26, 2011 in PCT/NL10/00154 Filed Oct. 26, 2010.

*Primary Examiner* — Kevin Lee
(74) *Attorney, Agent, or Firm* — Oblon, McClelland, Maier & Neustadt, L.L.P.

(57) ABSTRACT

The invention relates to a conduit for transferring milk. The conduit is provided with at least one flexible wall, which divides the conduit into at least one milk duct and at least one secondary duct. The milk duct and the at least one secondary duct extend along a longitudinal axis of the conduit, it being possible for the at least one milk duct to be substantially emptied by pressing through filling the at least one secondary duct.

20 Claims, 6 Drawing Sheets

(51) Int. Cl.
  *A01J 5/04*    (2006.01)
  *F16L 11/12*   (2006.01)
  *F16L 11/22*   (2006.01)
  *A01J 5/00*    (2006.01)
  *A01J 7/00*    (2006.01)
  *A01J 11/00*   (2006.01)
  *F16L 9/18*    (2006.01)

(56) References Cited

U.S. PATENT DOCUMENTS

| | | |
|---|---|---|
| 3,039,733 A | 6/1962 | Mattioli |
| 3,499,461 A * | 3/1970 | Tuma .................. A01J 5/04 |
| | | 137/240 |
| 4,232,703 A | 11/1980 | Celi |
| 4,366,943 A * | 1/1983 | Licary ................. A01J 7/02 |
| | | 251/30.02 |
| 5,186,431 A | 2/1993 | Tamari |
| 6,070,553 A | 6/2000 | Buecker |
| 7,100,887 B2 | 9/2006 | Multhammer |
| 8,002,725 B2 | 8/2011 | Hogendijk |
| 8,997,778 B2 * | 4/2015 | Mostert ............... A01J 5/044 |
| | | 137/240 |
| 2005/0126598 A1 | 6/2005 | Multhammer ............ 137/1 |

\* cited by examiner

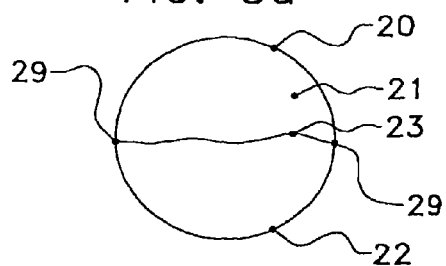
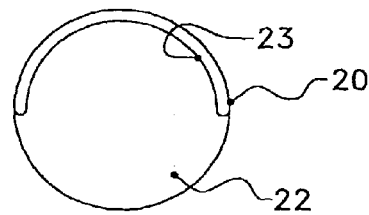
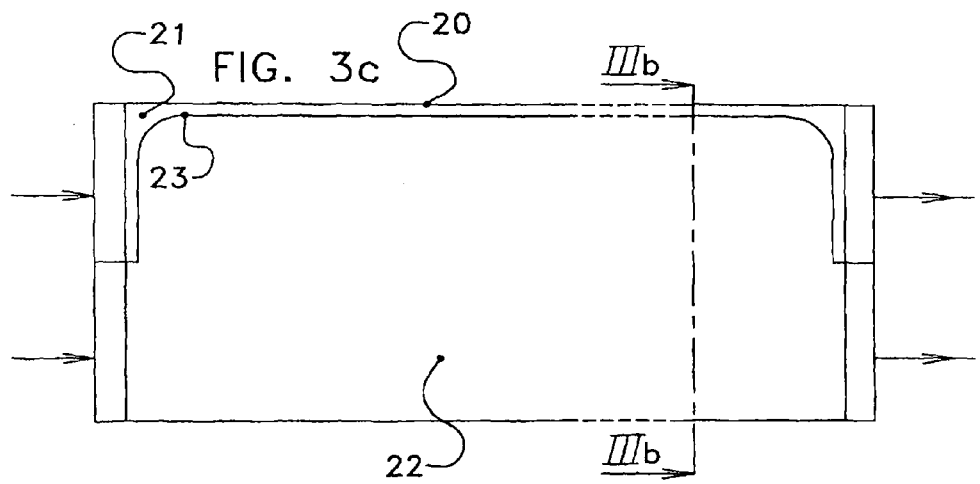
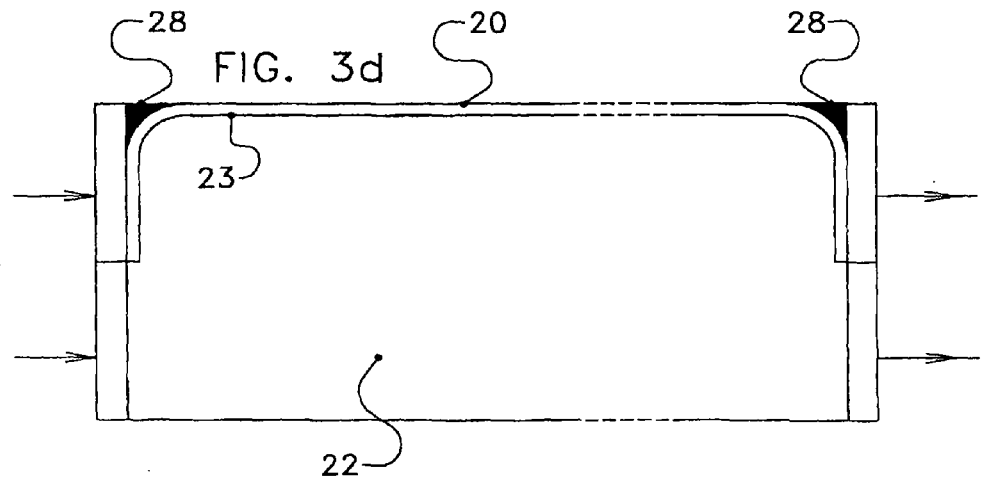

CONDUIT AND A METHOD OF CLEANING A CONDUIT

CROSS-REFERENCE TO RELATED APPLICATIONS

This application is a continuation of and claims the benefit of priority under 35 U.S.C. §120 from U.S. application Ser. No. 13/497,435, filed Mar. 21, 2012, now U.S. Pat. No. 8,997,778, which is a National Stage of PCT Application No. PCT/NL10/000154, filed Oct. 26, 2010, and claims the benefit of priority under 35 U.S.C. §119 of Netherlands Application No. 1037456, filed Nov. 9, 2009; the entire contents of each of which are incorporated herein by reference.

TECHNICAL FIELD

The present invention relates to a conduit for transferring milk. The invention further relates to a milking device comprising such a conduit, a method of cleaning such a conduit and a method for transferring milk through such a conduit.

PRIOR ART

Milking devices are used for milking dairy animals.

FIG. 1 diagrammatically shows a part of a milking device 1 according to the prior art. The milking device 1 comprises a milking glass 10 in which the milk obtained from a dairy animal is collected. FIG. 1 does not show the part of the milking device 1 which is configured to suck the milk from the dairy animal and transport the milk obtained to the milking glass 10.

Further, FIG. 1 shows that the milking glass 10 is connected to a further milk container 30, for example a milk tank 30, by means of a conduit 20. The milk tank 30 can be used to collect milk obtained during different milkings from different dairy animals and/or milking glasses and store it. Transferring the milk via the conduit 20 can be carried out, for example, by means of a pump 40, which may be arranged anywhere in the conduit 20, for example in the vicinity of the milking glass 10.

Such a milking device 1 can furthermore comprise a cooling device 50 to cool the milk in the conduit 20 in order to prevent it from spoiling. The cooling device 50 comprises a cooling conduit 51 which is arranged around the conduit 20 as a spiral, through which a cooling medium, for example water, can be pumped to cool the milk flowing through the conduit 20. The cooling device 50 furthermore comprises means for cooling and circulating the cooling medium pumped through the cooling conduit 51.

Such a conduit 20 has to be cleaned on a regular basis.

To this end, the prior art provides a fluid supply 60 and a cleaning liquid supply 64 which can alternately be brought into communication with the conduit 20 by means of a first distribution valve 61. The fluid supply 60 may be a source of gas or liquid and comprise, for example, a pump or may be filtered pressurized air. The cleaning liquid supply 64 may comprise a cleaning liquid, such as water. The cleaning liquid supply 64 may also comprise a pump for transferring the cleaning liquid.

The first distribution valve 61 is provided downstream of and in the vicinity of the pump 40. The first distribution valve 61 can be moved to a first position, in which the conduit 20 is connected to the milking glass 10,
second position, in which the conduit 20 is connected to the fluid supply 60, and
third position, in which the conduit 20 is connected to the cleaning liquid supply 64.

Downstream of the conduit 20, near the milk container 30, a second distribution valve 62 is provided. The second distribution valve 62 can be moved to a first position, in which the conduit 20 is connected to the milk container 30, and
second position, in which the conduit 20 is connected to an outlet 63.

During the transfer of the milk from the milking glass 10 to the milk container 30 via the conduit 20, the first distribution valve 61 and the second distribution valve 62 are both in the first position.

Cleaning of the conduit 20 can then take place by successively carrying out a first emptying stage, a
cleaning stage, and a
second emptying stage.

During the first emptying stage, the first distribution valve 61 is moved to the second position and the second distribution valve 62 stays in the first position. Then, the pressurized air is blown from the fluid supply 60 through the conduit 20 in order to blow any milk which is still present in the conduit 20 to the milk container 30.

During the cleaning stage, the first distribution valve 61 is moved to the third position and the second distribution valve 62 is moved to the second position in order to flush the conduit 20 with cleaning liquid from the cleaning liquid supply 64 in order to clean the conduit. The cleaning liquid can be discharged via outlet 63.

Subsequently, during the second emptying stage, the first distribution valve 61 can again be moved to the second position, while the second distribution valve 62 remains in the second position, and the conduit 20 can be emptied by means of the fluid supply 60 in order to remove any cleaning liquid which is still present in the conduit 20 from the conduit 20.

Thereafter, the first distribution valve 61 and the second distribution valve 62 can be moved to the first position again and milk can be transferred through the conduit 20 again.

Such a milking device has the drawback that it is relatively complicated and comprises many different parts. The milking device furthermore uses relatively expensive pressurized air or something similar in order to empty the conduit. This pressurized air has to be clean in order not to unnecessarily soil the conduit. In addition, an amply sufficient amount of pressurized air has to always be blown through the conduit in order to ensure that the conduit is indeed empty.

SUMMARY OF THE INVENTION

It is an object of the present invention to provide a conduit which makes a simpler and more inexpensive milking device possible and, for example, makes simpler and more efficient cleaning of the conduit possible. It is a further object to provide a conduit by means of which simple and efficient cooling of milk during transportation is made possible.

This object is achieved by means of a conduit as disclosed below.

The milk duct and the secondary duct may extend substantially along the entire longitudinal axis of the conduit. The flexible wall may be configured such that it can close the milk duct along the entire length by pressing, or at least along a large part of the length of the conduit by filling the secondary duct so that the milk duct can be emptied by pressing. Therefore, the flexible wall has a flexibility which is such that it can close the milk duct by pressing or can empty it by pressing. The flexible wall may, for example, be able to expand, so that it can close the milk duct.

The pressure-induced closing or pressure-induced emptying of the milk duct may be effected by filling the secondary duct with a liquid or gas which has sufficient pressure to move and/or deform the flexible wall in such a manner that it empties the milk duct by pressing. Preferably, the milk duct is emptied along substantially the entire length of the conduit by pressing. Due to the non-compressible nature of liquids, it is preferred if a liquid is used for closing by pressing or emptying by pressing. In that case, control of, for example, complete closing and/or emptying by pressing is better.

Depending on the embodiment, the flexible wall can be pressed completely against an inner side of an outer wall of the conduit or the flexible wall can be closed by pressing against itself. This will be explained in more detail below by means of a number of embodiments.

Emptying the milk duct by pressing may be carried out in order to be sure that all the milk has been removed from the milk duct. The milk can be pressed towards the milk container. When carrying out a cleaning process, in which the milk duct is cleaned by means of a cleaning liquid which is suitable for the purpose, it is also possible thus to empty the milk duct in a simple manner by pressing, as a result of which any cleaning liquid which is still present in the milk duct can be pressed out of the milk duct to, for example, an outlet.

With such a conduit, it is therefore no longer necessary to empty the milk duct by blowing pressurized air or the like through in order thus to remove the milk or cleaning liquid from the milk duct.

The secondary duct can furthermore be used as a cooling duct, with it being possible to introduce a suitable cooling medium into the secondary duct. This can be effected, for example, by pumping a cooling medium through the secondary duct, preferably in a direction opposite to the direction of flow of the transferred milk, in order to thus achieve optimum cooling.

According to one embodiment, a conduit is provided, wherein the milk duct is substantially surrounded by the at least one secondary duct, or the secondary duct is substantially surrounded by the at least one milk duct. In other words, the milk duct and the secondary duct are substantially arranged concentrically with respect to one another. The milk duct may, for example, be surrounded by the at least one secondary duct, it being possible for the at least one secondary duct to have an annular cross section, the secondary duct surrounding the milk duct and being formed by an outer side of the flexible wall and an inner side of an outer wall of the conduit. The milk duct may be attached to the outer wall of the conduit at a few locations on its periphery, as a result of which the secondary duct may be divided into a number of subducts. Attachment of the milk duct to the outer wall of the conduit can be achieved by connections which extend substantially along the longitudinal axis of the conduit. Thus, a plurality secondary ducts may be produced.

Examples thereof will be discussed below. The secondary duct substantially surrounds the milk duct in such a way that the secondary duct can empty the milk duct by pressing and an efficient exchange of heat can take place between the milk in the milk duct and a cooling medium in the secondary duct.

The milk duct and the secondary duct may also be swapped compared to the example described here.

According to one embodiment, a conduit is provided, wherein the flexible wall itself forms a passage, wherein the passage forms the milk duct or the secondary duct.

This can be achieved by designing the flexible wall in the form of a hose, for example by means of two flexible layers which are attached to one another along edges which extend along the longitudinal axis and thus create a passage between the edges which have been attached to one another. In this way, the flexible wall can be used to form a milk duct. The secondary duct can be formed by placing the flexible wall in the conduit. Such a flexible wall furthermore has the advantage that an efficient exchange of heat can take place between the milk duct and the secondary duct. The flexible wall forms a passage, may be arranged loosely in the conduit or may be attached to an outer wall of the conduit at certain locations.

According to one embodiment, a conduit is provided, wherein the flexible wall is attached to the wall of the conduit by means of spacers.

Such spacers ensure that the flexible wall is positioned substantially in the centre of the conduit. In this way, an outer duct (for example the secondary duct) is formed which is substantially annular, or a plurality outer ducts are formed which surround an inner duct on all sides. This contributes to an efficient exchange of heat between the milk duct and the secondary duct. Such spacers also ensure that when milk is transferred through the conduit, the secondary duct also remains open and can be used to allow a cooling medium to flow through.

According to one embodiment, a conduit is provided, wherein a single flexible wall is attached to an inner side of the conduit by means of a first attachment and a second attachment, wherein the first and the second attachments extend along the longitudinal axis of the conduit.

In this way, the milk duct and the secondary duct are formed along the longitudinal axis of the conduit and a relatively simple flexible wall can be used.

The attachment can be designed in many ways. The attachment furthermore serves to keep the flexible wall in place.

The first and second attachments may be situated at diametrically opposite positions. This results in the milk duct and the secondary duct being approximately the same size and being positioned symmetrically with respect to one another and a relatively large surface area being created between the milk duct and the secondary duct via which exchange of heat can take place. This contributes to an efficient cooling of the milk in the milk duct.

According to one embodiment, a conduit is provided, wherein the flexible wall comprises at least one of the materials from the group: polyethene, Teflon, silicone.

The wall is preferably made from a flexible material, such as the abovementioned materials.

The term flexible is used here to indicate that the shape and position of the wall can change, depending on the pressure which is present on either side of the flexible wall. The wall can also expand in order to thus be able to close the milk duct by pressing.

According to one aspect, a milking device is provided, comprising a conduit as described above.

According to one embodiment, a milking device is provided, wherein an inlet side of the at least one milk duct of the conduit is in communication with a milk supply and a cleaning liquid supply via a distribution valve.

In this way, the milk duct can alternately be connected to a milk supply, such as a milking glass, or a cleaning liquid supply. The cleaning liquid supply may, for example, supply a cleaning liquid, for example water which may or may not contain a cleaner, in order to clean the milk duct.

According to one embodiment, a milking device is provided, wherein an outlet side of the at least one milk duct is in communication with a milk container and an outlet via a second distribution valve. Depending on which substance is passed through the milk duct, the milk duct can be brought into communication with the milk container or an outlet.

According to one embodiment, a milking device is provided, wherein the at least one secondary duct of the conduit is in communication with at least one fluid supply.

The fluid supply may be a liquid supply or a gas supply (for example pressurized air) which is capable of supplying fluid at a sufficiently high pressure to empty a milk duct filled with liquid by pressing. Again, due to the non-compressible nature of liquids, the fluid supply is advantageously a liquid supply. In particular, the fluid supply is a water supply, more particularly a mains water supply.

The fluid can preferably be supplied in both directions of flow, that is to say in a direction which is identical to the downstream direction of the milk and in an opposite direction.

According to one embodiment, a milking device is provided, wherein the at least one fluid supply comprises a cooling device for cooling the fluid. Advantageously, the cooling device is positioned such that it cools the fluid, especially water, before this enters the secondary duct. The milking device comprising a cooling water device may comprise a closed cooling water circuit, in which cooling therefore takes place at least once during circulation. It should be noted that mains water, at least water at ambient temperature, in most cases already has a cooling effect on the milk obtained.

Such a milking device has the advantage that no separate devices have to be provided for cooling and emptying the conduit, since both functions can now be carried out by one device.

According to one embodiment, a milking device is provided which is furthermore provided with a coupling piece for coupling the conduit to a component of the milking device, wherein the coupling piece is provided with a coupling face having at least one milk opening and at least one secondary opening which are meant to be brought into open communication with the at least one milk duct and the at least one secondary duct, respectively.

The positioning of the at least one milk opening and the at least one secondary opening in the coupling piece is adapted to the mutual positioning of the milk duct and the secondary duct.

If the milk duct and the secondary duct are positioned concentrically with respect to one another, with, for example, the milk duct being surrounded by the secondary duct, the coupling piece may be provided with a milk opening positioned in the centre and at least one secondary opening which is or are distributed around the entire periphery of the milk opening. Thus, a compact, space-saving coupling is produced for a conduit comprising a milk duct and a secondary duct. However, other coupling pieces can also be used, such as for example those made by John Guest.

According to one aspect, a method is provided for cleaning a conduit, wherein the conduit comprises a milk duct and secondary duct which are separated by a flexible wall, wherein the method comprises:

an emptying stage for emptying the milk duct, wherein the emptying stage is carried out by emptying the milk duct by pressing through filling the secondary duct.

The method can be used after a number of dairy animals have been milked in order to remove any milk which may still be present in the milk duct from the milk duct. In this way, no milk is lost or deteriorates in the conduit. Furthermore, the milk can be removed from the milk duct before a cleaning stage is carried out.

The emptying stage can also be used after a cleaning stage for removing cleaning liquid from the milk duct has been carried out.

The method has the advantage that no pressurized air or the like is required in the milk duct. Neither is it necessary to clean the medium by means of which the milk duct is emptied by pressing before use, as is the case in the prior art where, for example, use is made of filtered pressurized air, because the medium which is used is not introduced into the milk duct.

The secondary duct can be filled with high-pressure gas or air, but as has already been mentioned above, advantageously with a suitable liquid, such as for example water.

According to one embodiment, the method comprises:
a first emptying stage for emptying the milk duct,
a cleaning stage for cleaning the milk duct, and a
second emptying stage for emptying the milk duct.

The first and/or the second emptying stage can be carried out by emptying the milk duct by pressing through filling the secondary duct. Emptying the milk duct by pressing can be effected by filling the secondary duct with a medium which is suitable for the purpose, such as a liquid, having sufficient pressure. The pressure of the medium at least has to be higher than the pressure prevailing at that moment in the milk duct. The higher the pressure, the quicker the milk duct can be emptied by pressing.

During the first emptying stage, the milk which is still present can be forced from the milk duct into the milk container. During the second emptying stage, the cleaning liquid which is still present can be forced in the direction of an outlet.

According to one aspect, a method is provided for transferring milk through a conduit as described above, wherein the method comprises causing a cooling medium to flow through the secondary duct.

In this way, cooling of the milk can be achieved in an advantageous manner. The cooling medium can preferably be transported in a direction opposite to the direction of flow of the milk.

BRIEF DESCRIPTION OF THE FIGURES

The invention will be explained in more detail with reference to the attached drawings. The drawings show a practical embodiment of the invention and should not be regarded as being limiting. Specific detailed features can also be seen as characteristic of the invention separate from the exemplary embodiment, in which.

DETAILED DESCRIPTION

Various embodiments will be discussed in more detail below with reference to the figures. In the figures, the conduits have a substantially round outer periphery. However, an elliptic outer periphery or any other suitable outer periphery is also conceivable and falls within the scope of the invention.

Figure 1:
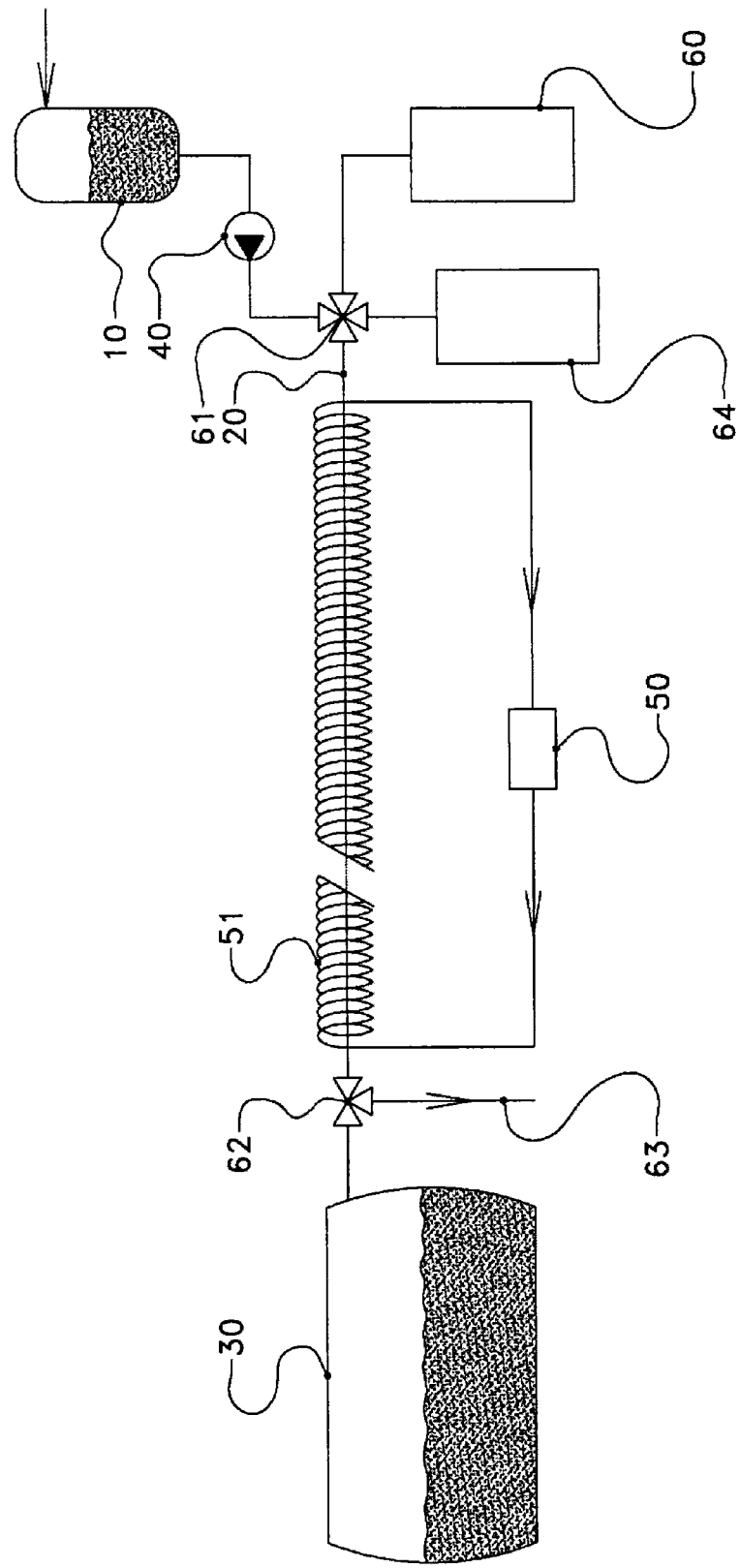
FIG. 1 diagrammatically shows a part of a milking device according to the prior art, FIG. 2 diagrammatically shows a part of a milking device according to one embodiment, FIGS. 3a-4e diagrammatically show a conduit according to different embodiments, FIG. 5 diagrammatically shows a part of a milking device according to a further embodiment, and FIG. 6 diagrammatically shows a coupling piece which can be used in the embodiments.
Figure 2:
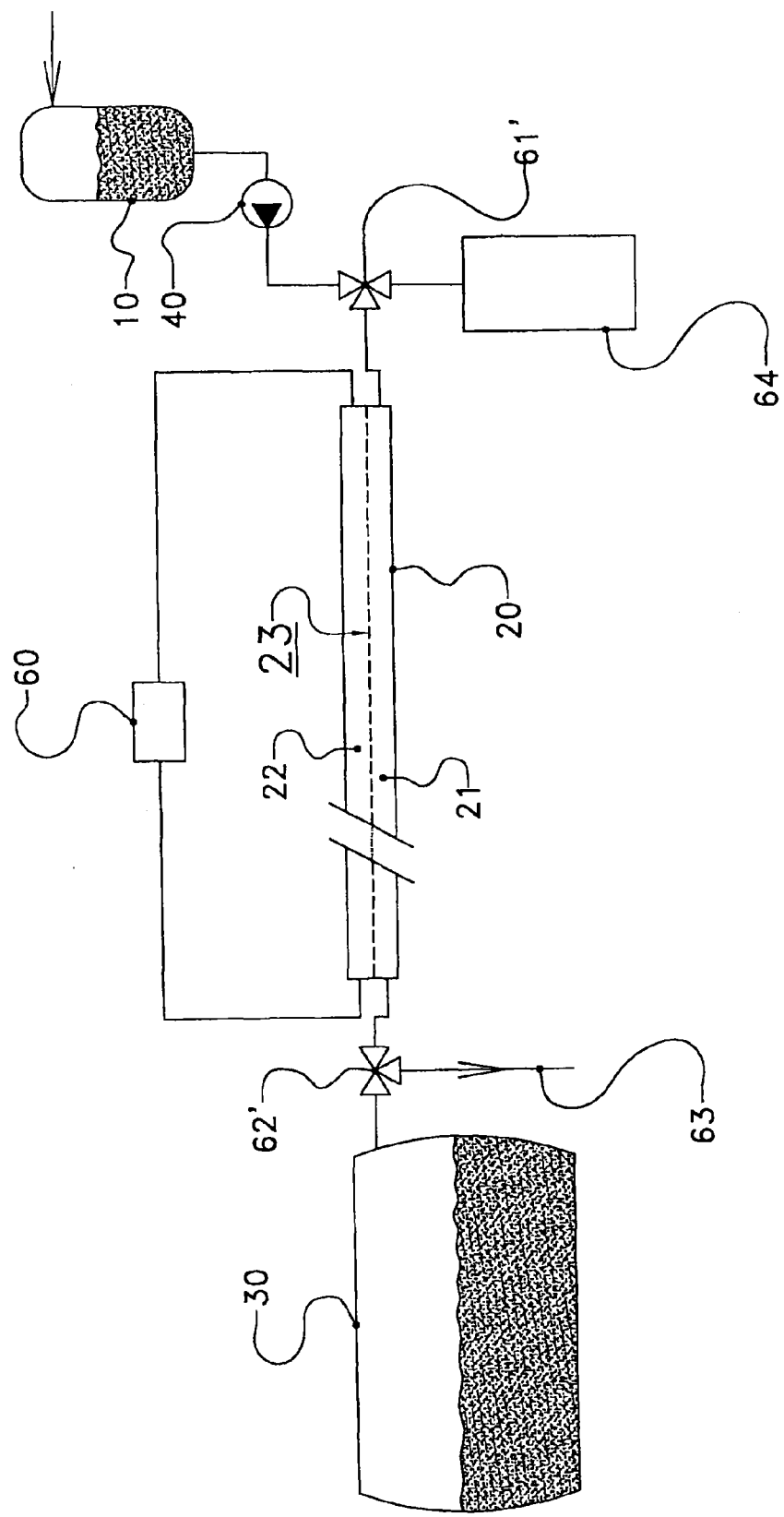

FIG. 2 diagrammatically shows an embodiment, in which similar elements are denoted by the same reference numerals as in FIG. 1.

FIG. 2 shows a conduit 20 which is subdivided into a milk duct 21 and a secondary duct 22 by means of a flexible wall 23.

On an inlet side of the milk duct 21, a first distribution valve 61' is provided. The first distribution valve 61' can be moved to a
- first position, in which the milk duct 21 is connected to the milking glass 10,
- second position, in which the milk duct 21 is connected to the cleaning liquid supply 64.

On an outlet side of the milk duct 21, a second distribution valve 62' is provided. The second distribution valve 62' can be moved to a
- first position, in which the milk duct 21 is connected to the milk container 30, and a
- second position, in which the milk duct 21 is connected to an outlet 63.

The secondary duct 22 is connected to at least one fluid supply 60 on both sides. FIG. 2 shows a single fluid supply 60, which can introduce a fluid, such as water or air, into the secondary duct 22. The fluid supply 60 may, for example, comprise a pump for transferring the fluid. The fluid supply 60 may, for example during the transferral of milk through the milk duct 21, transfer water through the secondary duct 22 in order to cool the milk in the milk duct 21. The fluid supply 60 can also, as part of a method of cleaning the milk duct 21, introduce a fluid into the secondary duct, such as water or air, in order thus to empty the milk duct 21 by pressing. Different fluid supplies 60 can be used for cooling the milk and emptying the milk duct 21, which fluid supplies 60 can alternately be brought into communication with the secondary duct 22 by means of distribution valves (not shown).

This can be done in order to be able to use different fluids for cooling and emptying by pressing. For example, water can be used for cooling, while pressurized air can be used for emptying by pressing.

Fluid supply 60 may thus be suitable to provide different fluids in different directions of flow. Fluid supply 60 can thus consist of a plurality fluid supplies 60 and/or distribution valves may be provided for varying the direction of flow and/or the fluid through the secondary duct 22.

Distribution valves (not shown) may also be provided in order to be able to change the direction of flow of the fluid through the secondary duct 22. During the cooling of milk, it is preferably possible to choose a direction of flow of the fluid through the secondary duct which is opposite to the direction of flow of the milk through the milk duct 21, while during the emptying of the milk duct 21 by pressing, the secondary duct 22 can, on the contrary, be filled in the upstream direction, the upstream direction being defined as the direction along the conduit 20 of the milking glass 10 towards the milk tank 30.

A possible embodiment of the conduit 20 will now be discussed with reference to FIGS. 3a-3d.

FIGS. 3a and 3b show a cross section of the conduit 20 in the direction of the longitudinal axis of the conduit 20. The figures show conduit 20, a flexible wall 23 being attached to an inner side of the conduit 20. The flexible wall 23 is attached to the inner side of the conduit 20 by means of two attachments 29. In this way, a milk duct 21 and a secondary duct 22 are formed. The attachments 29 extend along the longitudinal axis of the conduit 20.

FIG. 3a shows a state in which the milk duct 21 and the flexible duct 22 are approximately equal in size. This may be the case, for example, in a situation in which milk is transferred through the milk duct 21 and a cooling fluid, for example water, is simultaneously transferred through the secondary duct 22 in order to cool the milk.

FIG. 3b shows a state in which the secondary duct 22 is filled with a fluid, for example water or pressurized air, in such a manner that the flexible wall 23 is deformed, displaced and/or expanded such that the milk duct 21 is completely closed by pressing.

This situation is also shown in FIG. 3c, which shows a cross section of the conduit 20 in a direction transverse to the direction of flow. As can be seen, the milk duct is emptied along virtually the entire length of the conduit 20 by pressing.

As can be seen in FIG. 3c, it is possible that the flexible wall 23 is not able to entirely close the milk duct 21 by pressing, so that some space remains in the corners, near the inlet and the outlet. So as to prevent milk or cleaning liquid from remaining behind, filler parts 28 can be placed in the corners so that the flexible wall can empty the entire milk duct 21 virtually completely by pressing. Such an embodiment using filler parts 28 is illustrated in FIG. 3d.

An alternative embodiment of the conduit 20 will be described below with reference to FIGS. 4a-4e.

Figure 4A:
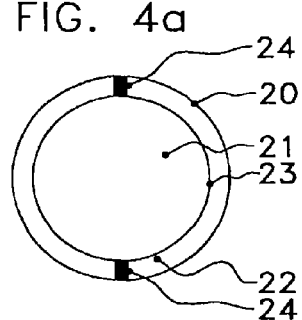

FIG. 4a diagrammatically shows a cross section in the direction of flow of a conduit 20, in which the flexible wall 23 itself forms a passage, the passage forming the milk duct 21 or the secondary duct 22. The flexible wall 23 is attached to the wall of the conduit 20 by means of spacers 24 in order to create space for the outer duct, for example the secondary duct 22.

Figure 4B:
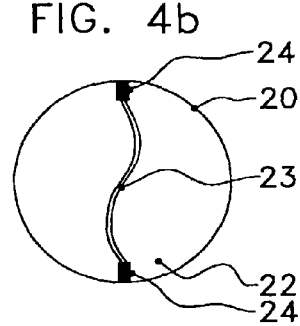
Figure 4C:
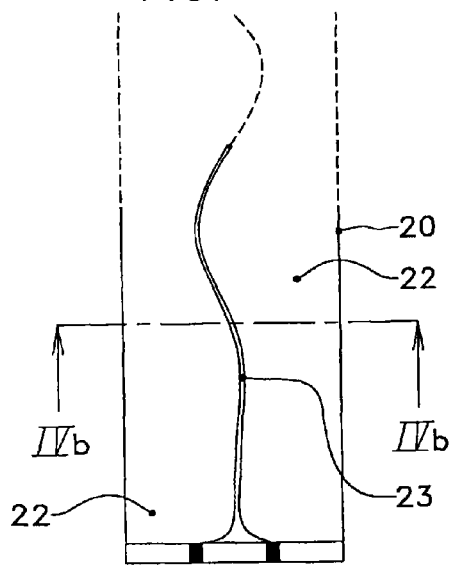

FIG. 4a shows that the passage formed by the flexible wall 23 is milk duct 21, which is surrounded by the secondary duct 22. The secondary duct 22 can be filled with a fluid in order to empty the milk duct 21 by pressing. This situation is illustrated in FIG. 4b by means of a cross section in the direction of flow. This situation is also shown in FIG. 4c, which shows a cross section of the conduit 20 in a direction at right angles to the direction of flow.

Figure 4D:
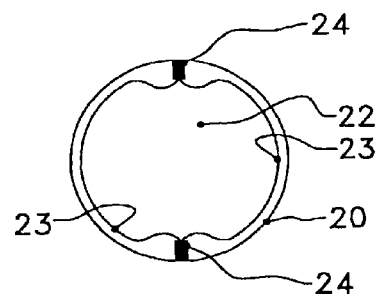
Figure 4E:
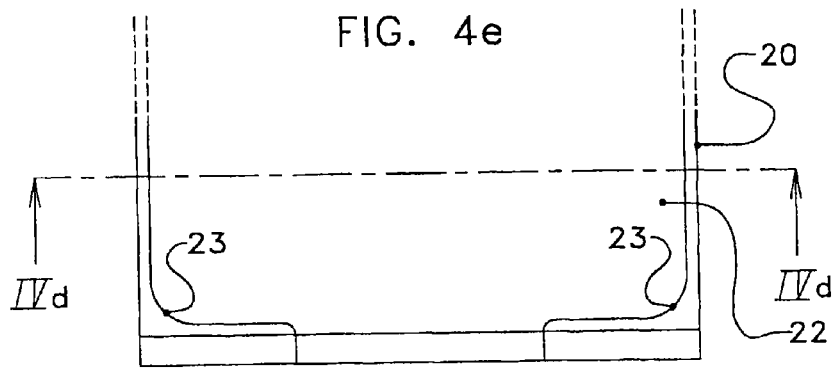

In an alternative embodiment, the passage formed by the flexible wall 23 is the secondary duct 22, which is surrounded by the milk duct 21. FIGS. 4d and 4e show the same situations as FIGS. 4b and 4c for this embodiment, that is to say the situation in which the milk duct 21 is emptied by pressing.

Method

The conduits 20 make it possible to use an advantageous method of cleaning them. Milk which has remained behind in the milk duct 21 can be removed in a simple and efficient way from the milk duct 21 by filling the secondary duct 22 in such a manner that the milk duct 21 is emptied by pressing. Even after the application of a cleaning stage, the cleaning liquid used can be removed from the milk duct 21 in a similar manner.

Figure 5:
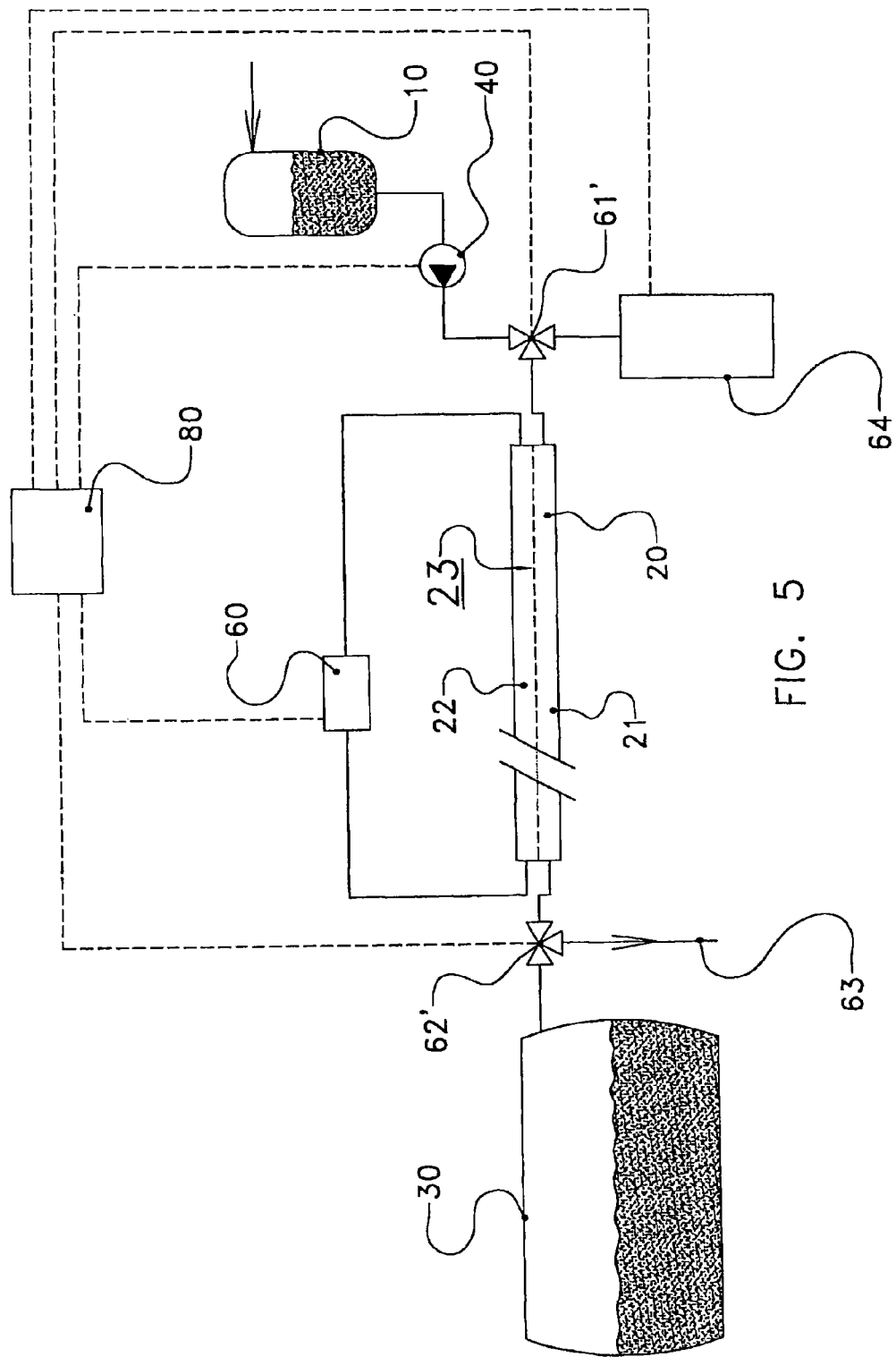

FIG. 5 diagrammatically shows a milking device according to a further embodiment, which furthermore comprises a control device 80.

The control device 80 may be designed as a computer, and may comprise hardware and software components which give the control device 80 the required functionality in accordance with the method described in the present application. Here, the control device 80 is shown as a single component. However, it will be understood that the control device 80 can be formed by a plurality spaced-apart, interacting components, or may, on the contrary, form part of a larger control device, for example a control device for controlling a milking device which comprises a plurality milk-pumping devices.

The control device 80 may be connected to the first and second distribution valves 61', 62 in order to actuate these. Furthermore, the control device 80 may be connected to the fluid supply 60 and to the cleaning liquid supply 64 in order to actuate these.

The control device 80 may be configured to carry out a method of cleaning of the conduit 20, wherein the conduit 20 is a conduit in accordance with one of the embodiments described in the present document, which method may comprise:
   an emptying stage for emptying the milk duct 21, wherein the emptying stage is carried out by means of emptying the milk duct 21 by pressing through filling the secondary duct 22.

Carrying out this emptying stage may consist of actuating the fluid supply 60 to introduce a fluid into the secondary duct so that the milk duct 21 is emptied by pressing. The fluid is preferably introduced into the secondary duct in a downstream direction.

Carrying out the emptying stage may further comprise actuating the second distribution valve 62' to bring this to the first or the second position. If the milk duct 21 is filled with milk, the second distribution valve 62' can be brought to the first position (in which the milk duct 21 is connected to the milk container 30) and if the milk duct 21 is filled with a cleaning liquid, the second distribution valve 62' can be brought to the second position (in which the milk duct 21 is connected to an outlet 63).

Carrying out a method of cleaning may comprise a number of stages, such as:
   a first emptying stage for emptying the milk duct 21,
   a cleaning stage for cleaning of the milk duct 21, and a
   second emptying stage for emptying the milk duct 21.

When carrying out the first emptying stage, the control device 80 can bring the second distribution valve 62' to the first position (in which the milk duct 21 is connected to the milk container 30).

When carrying out the cleaning stage, the control device 80 can bring the first distribution valve 61' to the second position, in which the milk duct 21 is connected to the cleaning liquid supply 64 and can bring the second distribution valve 62' to the second position, in which the milk duct 21 is connected to the outlet 63.

Finally, after carrying out the second emptying stage, the control device 80 can return both the first and second distribution valves 61', 62' to the first position in order to make the conduit 20 ready for transferring milk again.

The control device 80 may furthermore be suitable for carrying out a method for transferring milk through the conduit. To this end, the control device 80 can be connected to pump 40 and be configured to switch pump 40 on and off. The method for transferring milk may comprise a number of stages, such as bringing the first and second distribution valves 61', 62' to the first position if they are not already in the first position. The method may furthermore comprise actuating pump 40 for transferring an amount of milk through the conduit 20. Furthermore, the method may comprise actuating the fluid supply 60 in order to cause a cooling medium to flow through the secondary duct 22. Fluid supply 60 may also comprise a cooling device (not shown in FIG. 5) for cooling the cooling medium.

Figure 6:
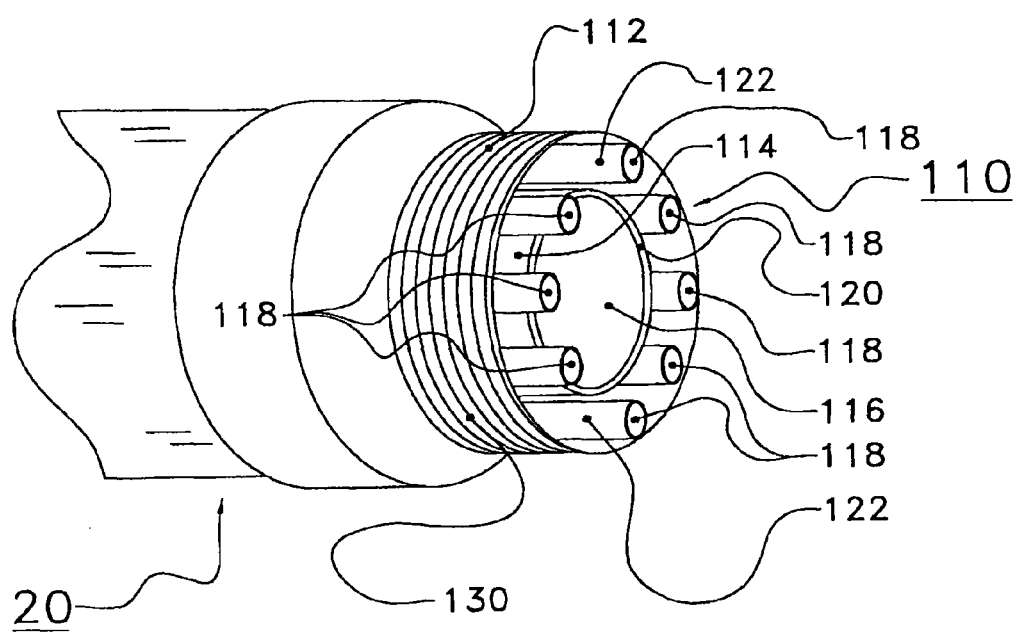

FIG. 6 shows a coupling piece 110 which can be used in order to couple a conduit 20 to a component of the milking device, such as on the upstream side with the first distribution valve 61' and fluid supply 60 and on the downstream side with the second distribution valve 62' and fluid supply 60. Such coupling pieces 110 have previously been described in EP1872653.

The coupling piece 110 is provided with a coupling face having a main opening 116 and at least one secondary opening 118 which are intended to be brought into open communication with the milk duct 21 and with the secondary duct 22 of the flexible conduit 20, respectively.

If a conduit 20 such as the one discussed with reference to FIG. 4a is taken by way of example, the main opening can be used for connecting, for example, the milking glass 10 to the milk duct 21, and the at least one secondary opening 118 can be used for connecting the fluid supply 60 to the secondary duct.

The secondary openings 118 are distributed over the entire periphery of the main opening. The secondary openings 118 can also be in the form of a single annular secondary opening 118 or of a number of secondary openings 118, each of which has the shape of a part of an arc of a circle. Thus, a compact, space-saving coupling is obtained for a flexible milk hose with a plurality ducts.

By way of example, FIG. 6 shows a part of conduit 20 which is provided with a coupling piece 110. The coupling piece 110 comprises a cylindrical body 112, one end of which is connected to the conduit 20 and a second end can be seen as a coupling face 114. The coupling face 114 is provided with a main opening 116 and a plurality, in this case eight, secondary openings 118. From the coupling face 114, a main tube 120 and secondary tubes 122 extend. The main tube 120 is in open communication with the main opening 116. The secondary tubes 122 are in open communication with the respective secondary openings 118.

The invention claimed is:

1. A conduit for transferring milk, comprising:
   at least one flexible wall that divides the conduit into at least one milk duct and at least one secondary duct, the at least one milk duct and the at least one secondary duct extending along a longitudinal axis of the conduit, the at least one milk duct arranged to be substantially emptiable by pressing through filling the at least one secondary duct, and
   a distribution valve, wherein an inlet side of the at least one milk duct of the conduit is in communication with a milk supply and a cleaning liquid supply via the distribution valve.

2. The conduit according to claim 1, wherein the milk duct is substantially surrounded by the at least one secondary duct or the secondary duct is substantially surrounded by the at least one milk duct.

3. The conduit according to claim 1, wherein the flexible wall itself forms a passage, wherein the passage forms one of the milk duct and the secondary duct.

4. The conduit according to claim 2, wherein the flexible wall is attached to a wall of the conduit by spacers.

5. The conduit according to claim 1, wherein a single flexible wall is attached to an inner side of the conduit by a first attachment and a second attachment, wherein the first and the second attachments extend along a longitudinal axis of the conduit.

6. The conduit according to claim 1, wherein the flexible wall comprises at least one of the materials from the group: polyethene, Teflon, silicone.

7. The milking device, comprising:
a conduit according to claim 1.

8. The milking device according to Claim 1, further comprising a second distribution valve, wherein an outlet side of the at least one milk duct is in communication with a milk container and an outlet via the second distribution valve.

9. The milking device according to claim 7, further comprising at least one fluid supply, wherein the at least one secondary duct of the conduit is in communication with at least one fluid supply.

10. The milking device according to claim 9, wherein the at least one fluid supply comprises a cooling device for cooling the fluid.

11. The milking device according to claim 7, further comprising a coupling piece for coupling the conduit to a component of the milking device, wherein the coupling piece is provided with a coupling face having at least one milk opening and at least one secondary opening which are configured to be in open communication with the at least one milk duct and the at least one secondary duct, respectively.

12. The method of cleaning a conduit, the conduit including a milk duct and secondary duct which are separated by a flexible wall, the method comprising:
emptying the milk duct by pressing the flexible wall through filling the secondary duct, and
actuating a distribution valve, wherein an inlet side of the at least one milk duct of the conduit is in communication with a milk supply and a cleaning liquid supply via the distribution valve.

13. The method according to claim 12, wherein the emptying the milk duct includes:
a first emptying stage for emptying the milk duct,
a cleaning stage for cleaning the milk duct, and a
second emptying stage for emptying the milk duct.

14. The method for transferring milk through a conduit according to claim 13, further comprising causing a cooling medium to flow through the secondary duct.

15. The conduit for transferring milk, comprising:
at least one flexible wall that divides the conduit into at least one milk duct and at least one secondary duct, the at least one milk duct and the at least one secondary duct extending along a longitudinal axis of the conduit, the at least one milk duct structured so that on filling the at least one secondary duct the at least one secondary duct presses on the flexible wall to empty the at least one milk duct, and
a distribution valve, wherein an inlet side of the at least one milk duct of the conduit is in communication with a milk supply and a cleaning liquid supply via the distribution valve.

16. The conduit according to claim 15, wherein the milk duct is surrounded by the at least one secondary duct or the secondary duct is surrounded by the at least one milk duct.

17. The conduit according to claim 15, wherein the flexible wall itself forms a passage, wherein the passage forms one of the milk duct and the secondary duct.

18. The conduit according to claim 16, wherein the flexible wall is attached to a wall of the conduit by spacers.

19. The conduit according to claim 15, wherein a single flexible wall is attached to an inner side of the conduit by a first attachment and a second attachment, wherein the first and the second attachments extend along a longitudinal axis of the conduit.

20. The milking device, comprising:
a conduit for transferring milk, the conduit comprising at least one flexible wall that divides the conduit into at least one milk duct and at least one secondary duct, the at least one milk duct and the at least one secondary duct extending along a longitudinal axis of the conduit, the at least one milk duct arranged to be substantially emptiable by pressing through filling the at least one secondary duct, and
a coupling piece for coupling the conduit to a component of the milking device, wherein the coupling piece is provided with a coupling face having at least one milk opening and at least one secondary opening which are configured to be in open communication with the at least one milk duct and the at least one secondary duct, respectively.

* * * * *